(12) United States Patent
Da Silva et al.

(10) Patent No.: US 10,461,817 B2
(45) Date of Patent: Oct. 29, 2019

(54) ENHANCED MULTIPLE-INPUT MULTIPLE-OUTPUT BEAM REFINEMENT PROTOCOL TRANSMIT SECTOR SWEEP

(71) Applicant: Intel IP Corporation, Santa Clara, CA (US)

(72) Inventors: Claudio Da Silva, Portland, OR (US); Jonathan Kosloff, Tel Aviv (IL); Artyom Lomayev, Nizhny Novgorod (RU); Cheng Chen, Portland, OR (US); Carlos Cordeiro, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/229,573

(22) Filed: Dec. 21, 2018

(65) Prior Publication Data

US 2019/0158156 A1    May 23, 2019

Related U.S. Application Data

(60) Provisional application No. 62/612,888, filed on Jan. 2, 2018.

(51) Int. Cl.
*H04B 7/04*      (2017.01)
*H04B 7/0417*    (2017.01)
(Continued)

(52) U.S. Cl.
CPC ......... *H04B 7/0421* (2013.01); *H04B 7/0469* (2013.01); *H04B 7/0634* (2013.01);
(Continued)

(58) Field of Classification Search
CPC .. H04B 7/0421; H04B 7/0469; H04B 7/0634; H04B 7/0682; H04B 7/0684; H04B 7/0695
See application file for complete search history.

(56) References Cited

U.S. PATENT DOCUMENTS

2017/0134076 A1* 5/2017 Maamari ............. H04B 7/0452
2017/0317727 A1* 11/2017 Wang .................. H04B 7/0626
(Continued)

*Primary Examiner* — Freshteh N Aghdam
(74) *Attorney, Agent, or Firm* — Eversheds Sutherland (US) LLP

(57) ABSTRACT

This disclosure describes systems, methods, and devices related to enhanced multiple-input multiple-output (MIMO) beam refinement protocol (BRP) transmit sector sweep (TXSS). A device may establish a first communication link using a first antenna transmit chain of one or more transmit chains of the initiator, wherein the one or more antenna transmit chains further comprise a second antenna transmit chain. The device may initiate a MIMO BRP TXSS over the one or more antenna transmit chains. The device may map a single space-time stream over the one or more antenna transmit chains. The device may cause to send, to a responder device, an enhanced directional multi-gigabit (EDMG) frame using spatial expansion based on the mapping of the single space-time stream. The device may identify a feedback frame from the responder device. The device may determine one or more antenna weight vectors (AWVs) to use in a MIMO phase of the MIMO beamforming training based on the feedback frame.

20 Claims, 5 Drawing Sheets

(51) Int. Cl.
*H04B 7/06* (2006.01)
*H04B 7/0456* (2017.01)

(52) U.S. Cl.
CPC ......... *H04B 7/0682* (2013.01); *H04B 7/0684* (2013.01); *H04B 7/0695* (2013.01)

(56) References Cited

U.S. PATENT DOCUMENTS

| | | | |
|---|---|---|---|
| 2018/0198505 A1* | 7/2018 | Eitan | H04B 7/0491 |
| 2019/0123798 A1* | 4/2019 | Lou | H04B 7/0456 |
| 2019/0124652 A1* | 4/2019 | Kim | H04W 72/04 |

* cited by examiner

ENHANCED MULTIPLE-INPUT MULTIPLE-OUTPUT BEAM REFINEMENT PROTOCOL TRANSMIT SECTOR SWEEP

CROSS-REFERENCE TO RELATED APPLICATION(S)

This application claims the benefit of U.S. Provisional Application No. 62/612,888, filed Jan. 2, 2018, the disclosure of which is incorporated herein by reference as if set forth in full.

TECHNICAL FIELD

This disclosure generally relates to systems and methods for wireless communications and, more particularly, to enhanced multiple-input multiple-output (MIMO) beam refinement protocol (BRP) transmit sector sweep (TXSS).

BACKGROUND

Wireless devices are becoming widely prevalent and are increasingly requesting access to wireless channels. The growing density of wireless deployments require increased network and spectrum availability. Wireless devices may communicate with each other using directional transmission techniques, including but not limited to beamforming techniques. Wireless devices may communicate over a next generation 60 GHz (NG60) network, an enhanced directional multi-gigabit (EDMG) network, and/or any other network.

DETAILED DESCRIPTION

Figure 1:
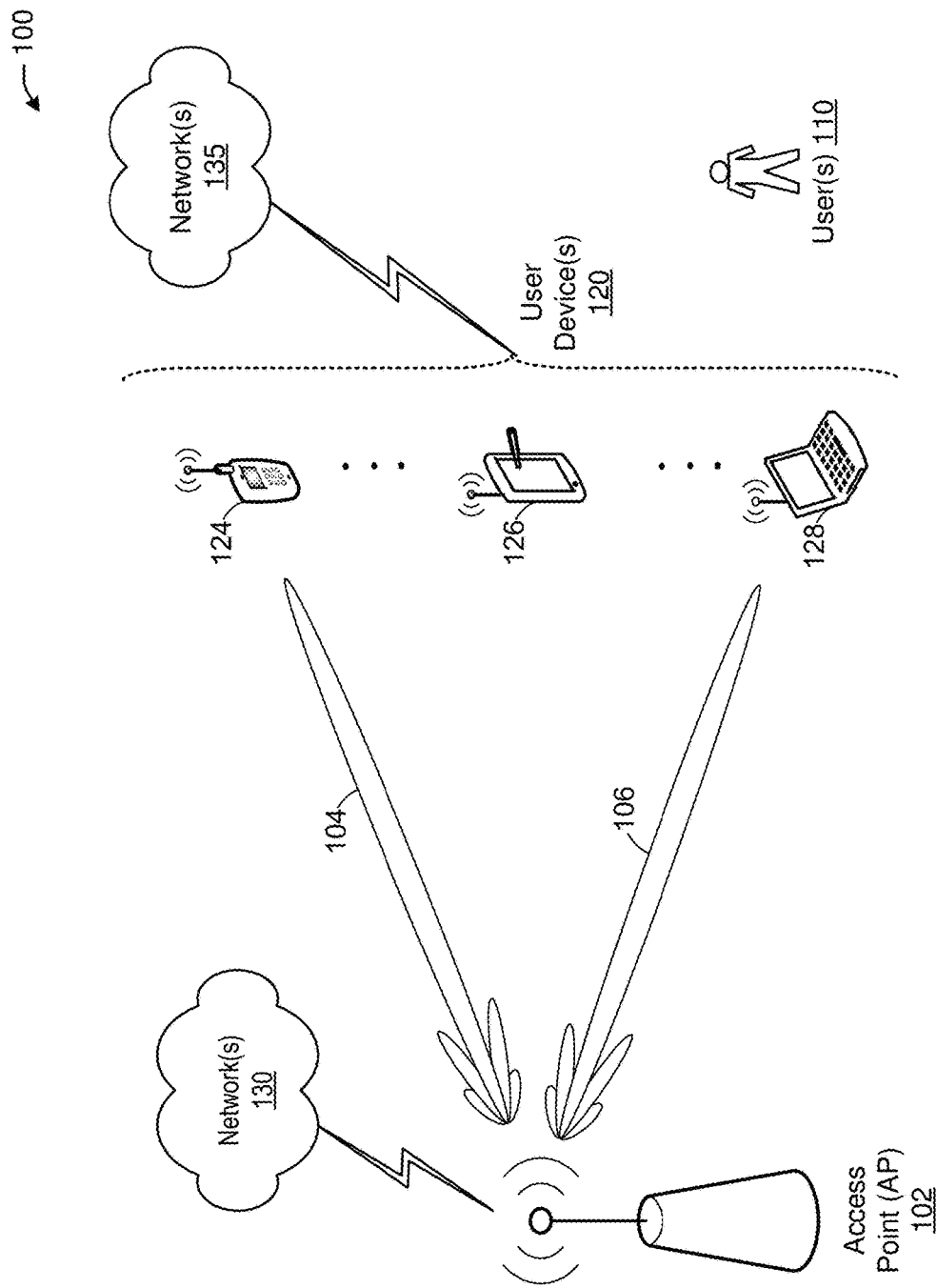
FIG. 1 depicts a network diagram illustrating an example network environment for Enhanced multiple-input multiple-output (MIMO) beam refinement protocol (BRP) transmit sector sweep (TXSS), in accordance with one or more example embodiments of the present disclosure.

Example embodiments described herein provide certain systems, methods, and devices for Enhanced MIMO BRP TXSS for time division duplex (TDD) network architectures. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Devices may communicate over a next generation 60 GHz (NG60) network, an enhanced directional multi-gigabit (EDMG) network, and/or any other network. Devices operating in EDMG may be referred to herein as EDMG devices. This may include user devices, and/or APs or other devices capable of communicating in accordance to a communication standard.

IEEE 802.11ay task group started development of the new standard in the mmWave (60 GHz) band, which is an evolution of the IEEE 802.11ad standard, also known as WiGig. The large bandwidth availability and its directional propagation nature make it very attractive for service providers who want to deliver high-speed internet to enterprises, small-to medium-sized businesses (SMBs), homes, etc., through a fixed wireless access (FWA) distribution network. Beam refinement protocol transmit sector sweep (BRP TXSS) is a procedure which makes use of BRP frames to perform transmit sector sweep and receive training and determine improved antenna configuration for transmission and reception. In BRP TXSS, the STA that initiates the procedure through the transmission of a BRP frame is referred to as the initiator, and the recipient STA of the BRP frame that participates in a BRP TXSS with the initiator is referred to as the responder.

The 802.11ay draft does not fully specify required configurations for two important cases: (1) the antenna and frame configuration to be used in multiple-input multiple-output (MIMO) BRP TXSS when two stations that participate in the procedure do not have an established MIMO link (that is, the stations have not yet determined antenna configurations for all of their transmit chains); and (2) the complete flow of the Initiator BRP TXSS and the Responder BRP TXSS within a MIMO BRP TXSS, including number of packets and antenna configurations to be used.

Example embodiments of the present disclosure relate to systems, methods, and devices for enhanced MIMO BRP TXSS.

A directional multi-gigabyte (DMG) communications may involve one or more directional links to communicate at a rate of multiple gigabits per second, for example, at least 1 gigabit per second, 7 gigabits per second, or any other rate. An amendment to a DMG operation in a 60 GHz band, e.g., according to an IEEE 802.11ad standard, may be defined, for example, by an IEEE 802.11ay project.

In some demonstrative embodiments, one or more devices may be configured to communicate over a next generation 60 GHz (NG60) network, an enhanced DMG (EDMG) network, and/or any other network. For example, the one or more devices may be configured to communicate over the NG60 or EDMG networks.

Station devices (STAs) may have multiple transmit chains associated with their multiple antennas. When two STAs associate with each other, a link is established using a single transmit chain. The other transmit chains on the STAs are not trained by this time. In fact, SISO BRP TXSS may be performed after a link (e.g., SISO link) has already been established for the purpose of finding better antenna configurations. The SISO link is established using a sector-sweep procedure.

As a result, physical layer (PHY) protocol data unit (PPDU) exchanges between the two STAs at this time are transmitted using a SISO transmission mode. After the link between the two stations has been established, MIMO transmissions may be performed after appropriate beamforming training has been performed. Specifically, before PPDUs are exchanged between the two STAs using a MIMO transmission mode, each STA must determine configurations for the multiple transmit chains associated with their multiple antennas. There are two forms of beam refinement protocol (BRP) transmit sector sweep (TXSS): (1) SISO BRP TXSS and (2) MIMO BRP TXSS. A SISO BRP TXSS is a BRP TXSS in which EDMG BRP packets used in the procedure are transmitted using a single transmit chain. A MIMO BRP TXSS is a BRP TXSS in which EDMG BRP packets used in the procedure are transmitted using multiple transmit chains. MIMO BRP TXSS is initiated and used in the first phase (referred to as the "SISO phase") of SU-MIMO beamforming training. Generally, a PPDU contains a preamble, a header, a data field and then there are training fields for the transmit chain that is being trained—in the SISO phase there is only one transmit chain being trained. The preamble, the header, and the data field are then received by the responder device, which will decode the information contained within these fields and may use it for communication between the two devices (the initiator and the responder). That is why in the SISO phase only a single transmit chain needs to be trained and not all the transmit chains of the initiator.

The multiple-input multiple-output (MIMO) beamforming training is broken down into two parts, a single input single output (SISO) phase and a MIMO phase. The SISO phase comprises either a MIMO BRP TXSS procedure or a SISO feedback procedure. Implementing a MIMO BRP TXSS procedure means that the SISO phase uses MIMO BRP TXSS instead of using conventional sector sweep packets in its beamforming training.

When performing a MIMO BRP TXSS, the device would have to switch from using SISO PPDUs to MIMO PPDUs. In that case, the antenna chains that have not been used when performing SISO transmissions would need to be turned on and trained in order to transmit these MIMO PPDUs.

Before the MIMO BRP TXSS phase is started, two stations (e.g., initiator and responder devices) exchange SISO PPDUs only. Because each station only uses one transmit chain in the transmission of SISO PPDUs, each station would only determine the antenna configuration (AWV) for one of its transmit chains (specifically, the one used in the transmission of SISO PPDUs). Once MIMO BRP TXSS is started, each station will use all transmit chains to be trained when sending MIMO PPDUs. However, the AWVs of transmit chains not used in the exchange of SISO PPDUs is likely not known when the MIMO BRP TXSS had been initiated.

The question becomes, what can the station do with the other transmit chains that have not been trained yet when the MIMO BRP TXSS procedure begins in the SISO phase of MIMO beamforming training.

In one or more embodiments, an enhanced MIMO BRP TXSS system may define two important configurations/flows of MIMO BRP TXSS. First, an enhanced MIMO BRP TXSS system may facilitate the determination of antenna and frame configurations (e.g., AWVs) that may be used in MIMO BRP TXSS to enable the use of the procedure when the two participating stations do not have an established MIMO link yet (e.g., during the SISO phase as described above). Second, an enhanced MIMO BRP TXSS system may define the overall flow of the Initiator BRP TXSS and the Responder BRP TXSS within a MIMO BRP TXSS, including number of packets and antenna configurations to be used.

In one or more embodiments, an enhanced MIMO BRP TXSS system may facilitate that at the end of the SISO phase of the MIMO BF training, while using the MIMO BRP TXSS, the transmitter would have a set of AWVs to use in the MIMO phase of the MIMO BF training. Each EDMG BRP-TX frame comprises a preamble and a TRN field. The TRN field may be comprised of multiple TRN subfields. The transmitter would use different AWVs when transmitting the TRN field of EDMG BRP-TX frames (that is, transmitter switches AWVs for each TRN subfield). When the receiver receives each of the TRN subfields, the receiver will take measurements (e.g., signal to noise ratio (SNR) and/or received signal strength indicator (RSSI)) for the different TRN subfields that were transmitted with different AWVs. The receiver would order all measurements and picks the best ones (e.g., the measurement with the highest SNR). For example, the receiver may pick three top best measurement, for example, top best measurements for TRN subfield number 15, TRN subfield number 40, and TRN subfield 4 (in a descending order, that is TRN subfield number 15 yielded the best measurement), the receiver would send feedback to the transmitter. The feedback would comprise the these three top best measurements (e.g., 15, 40, and 4). When the transmitter received the feedback, the transmitter learns that the best AWVs were 15, 40, and 4. Using the MIMO BRP TXSS procedure as it is performed as part of a SU-MIMO BF training, when the MIMO phase of SU-MIMO BF training starts, the transmitter will use these best AWVs when selecting which AWVs to use further in the second part of training (MIMO phase).

In one or more embodiments, an enhanced MIMO BRP TXSS system may facilitate that BRP frames sent in a MIMO BRP TXSS may be transmitted using EDMG PPDUs by applying spatial expansion and mapping a single space-time stream to all N transmit chains to be trained in the procedure. Spatial expansion is a way of transmitting the same data through multiple antennas. That is mapping one stream of data through multiple antennas. However, there may be unintentional beamforming because signals across the different antennas may combine since they transmit the same signal. A cyclic delay shift may then be added to each stream transmitted through each antenna to create a time shift between them. This procedure is known in the literature as cyclic shift diversity (CSD). The same data is received by the receiving device (e.g., responder) except that the TRNs are different for each transmit chain.

In one or more embodiments, an enhanced MIMO BRP TXSS system may facilitate that there may be four phases in the MIMO BRP TXSS: (1) setup phase, (2) an initiator BRP TXSS phase, (3) a responder BRP TXSS phase, and (4) a feedback phase.

In one or more embodiments, the enhanced MIMO BRP TXSS system may facilitate that the training (TRN) field of EDMG BRP-TX packets sent in a MIMO BRP TXSS may consist of N orthogonal waveforms.

In one or more embodiments, the enhanced MIMO BRP TXSS system may facilitate that the AWVs used in the transmission of all fields except for the TRN field of BRP frames sent using spatial expansion in a MIMO BRP TXSS: (1) may be the same one used in the setup phase for the transmit chain used in the setup phase; and (2) may be selected in an implementation dependent manner for transmit chains not used in the setup phase. That is, in the setup phase of a MIMO BRP TXSS, if an implementation has not yet determined AWVs to use in some of its transmit chains (for example, if a station has been only using a single transmit chain before the setup phase), the AWVs used by such chains should be selected in an implementation dependent manner. The DMG antennas and AWVs used in the transmission of all fields, except for the TRN field of BRP packets sent in the Initiator BRP TXSS, the Responder BRP TXSS, and with acknowledgement, may be the same ones used in the setup phase. For example, a first antenna uses the same AWV in the transmission of all frames of a BRP TXSS, where the AWV was selected during the setup phase. The selection of the AWV during the setup phase. In other words, once training is started, the station changes its antenna settings until the procedure is completed. It should be understood that this is not valid for the transmission of the TRN field. Similarly, the second antenna uses one AWV from the beginning to the end of the procedure. AWVs used by the first and second antennas is not necessarily the same.

In one or more embodiments, the enhanced MIMO BRP TXSS system may facilitate that the AWVs used in the reception of all fields, except for the TRN field of BRP frames, sent using spatial expansion in a MIMO BRP TXSS (1) may be the same one used in the setup phase for the receive chain used in the setup phase; and (2) may be selected in an implementation dependent manner for receive chains not used in the setup phase.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment for enhanced MIMO BRP TXSS, in accordance with one or more example embodiments of the present disclosure.

Wireless network 100 may include one or more user device(s) 120 and one or more access point(s) (AP) 102, which may communicate in accordance with IEEE 802.11 communication standards, such as IEEE 802.11ay, IEEE 802.11ad, millimeter-wave, and WiGig specifications. The user device(s) 120 may be referred to as stations (STAs). The user device(s) 120 may be mobile devices that are non-stationary and do not have fixed locations. Although the AP 102 is shown to be communicating on multiple antennas with user devices 120, it should be understood that this is only for illustrative purposes and that any user device 120 may also communicate using multiple antennas with other user devices 120 and/or AP 102.

In some embodiments, the user device(s) 120 and the AP 102 may include one or more computer systems similar to that of the functional diagram of FIG. 12 and/or the example machine/system of FIG. 13.

One or more illustrative user device(s) 120 and/or AP 102 may be operable by one or more user(s) 110. The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennas. The one or more communications antennas may be any suitable type of antennas corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The one or more communications antennas may be communicatively coupled to a radio component to transmit and/or receive signals, such as communications signals to and/or from the user devices 120 and/or AP 102.

Any of the user devices 120 (e.g., user devices 124, 126, 128), and AP 102 may include multiple antennas that may include one or more directional antennas. The one or more directional antennas may be steered to a plurality of beam directions. For example, at least one antenna of a user device 120 (or an AP 102) may be steered to a plurality of beam directions. For example, a user device 120 (or an AP 102) may transmit a directional transmission to another user device 120 (or another AP 102).

Any of the user device(s) 120 (e.g., user devices 124, 126, 128), and AP 102 may be configured to perform directional transmission and/or directional reception in conjunction with wirelessly communicating in a wireless network. Any of the user device(s) 120 (e.g., user devices 124, 126, 128), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP 102 may be configured to perform any given directional transmission towards one or more defined transmit sectors. Any of the user device(s) 120 (e.g., user devices 124, 126, 128), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad, 802.11ay). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Some demonstrative embodiments may be used in conjunction with a wireless communication network communicating over a frequency band of 60 GHz. However, other embodiments may be implemented utilizing any other suitable wireless communication frequency bands, for example, an extremely high frequency (EHF) band (the millimeter wave (mmWave) frequency band), a frequency band within the frequency band of between 20 GHz and 300 GHz, a WLAN frequency band, a WPAN frequency band, a frequency band according to the WGA specification, and the like.

The phrases "directional multi-gigabit (DMG)" and "directional band (DBand)", as used herein, may relate to a frequency band wherein the channel starting frequency is above 45 GHz. In one example, DMG communications may involve one or more directional links to communicate at a rate of multiple gigabits per second, for example, at least 1 gigabit per second, 7 gigabits per second, or any other rate.

In some demonstrative embodiments, the user device(s) 120 and/or the AP 102 may be configured to operate in accordance with one or more specifications, including one or more IEEE 802.11 specifications, (e.g., an IEEE 802.11ad specification, an IEEE 802.11ay specification, and/or any other specification and/or protocol). For example, an amendment to a DMG operation in the 60 GHz band, according to an IEEE 802.11ad standard, may be defined, for example, by an IEEE 802.11ay project.

It is understood that a basic service set (BSS) provides the basic building block of an 802.11 wireless LAN. For example, in infrastructure mode, a single access point (AP) together with all associated stations (STAs) is called a BSS.

In some demonstrative embodiments, and/or AP 102 may be configured to support one or more mechanisms and/or features, for example, channel bonding, single user (SU) MIMO, and/or and multi user (MU) MIMO, for example, in accordance with an EDMG Standard, an IEEE 802.11ay standard and/or any other standard and/or protocol.

In one embodiment, and with reference to FIG. 1, an initiator (e.g., AP 102) may be configured to communicate with one or more responders (e.g., non-AP STAs, such as, user devices 120).

For example, in order for the AP 102 to establish communication with two devices (e.g., user device 124 and user device 128), the AP 102 may need to perform beamforming training with the user device 124 and the user device 128 using beams 104 and 106. The AP 102 may transmit one or more sector sweep (SSW) frames over different antenna sectors defined by the one providing high signal quality between the AP 102 and the user device 124 and the user device 128. However, the SSW frames may reach the user device 126. It is understood that the above descriptions are for purposes of illustration and are not meant to be limiting.

Figure 2:
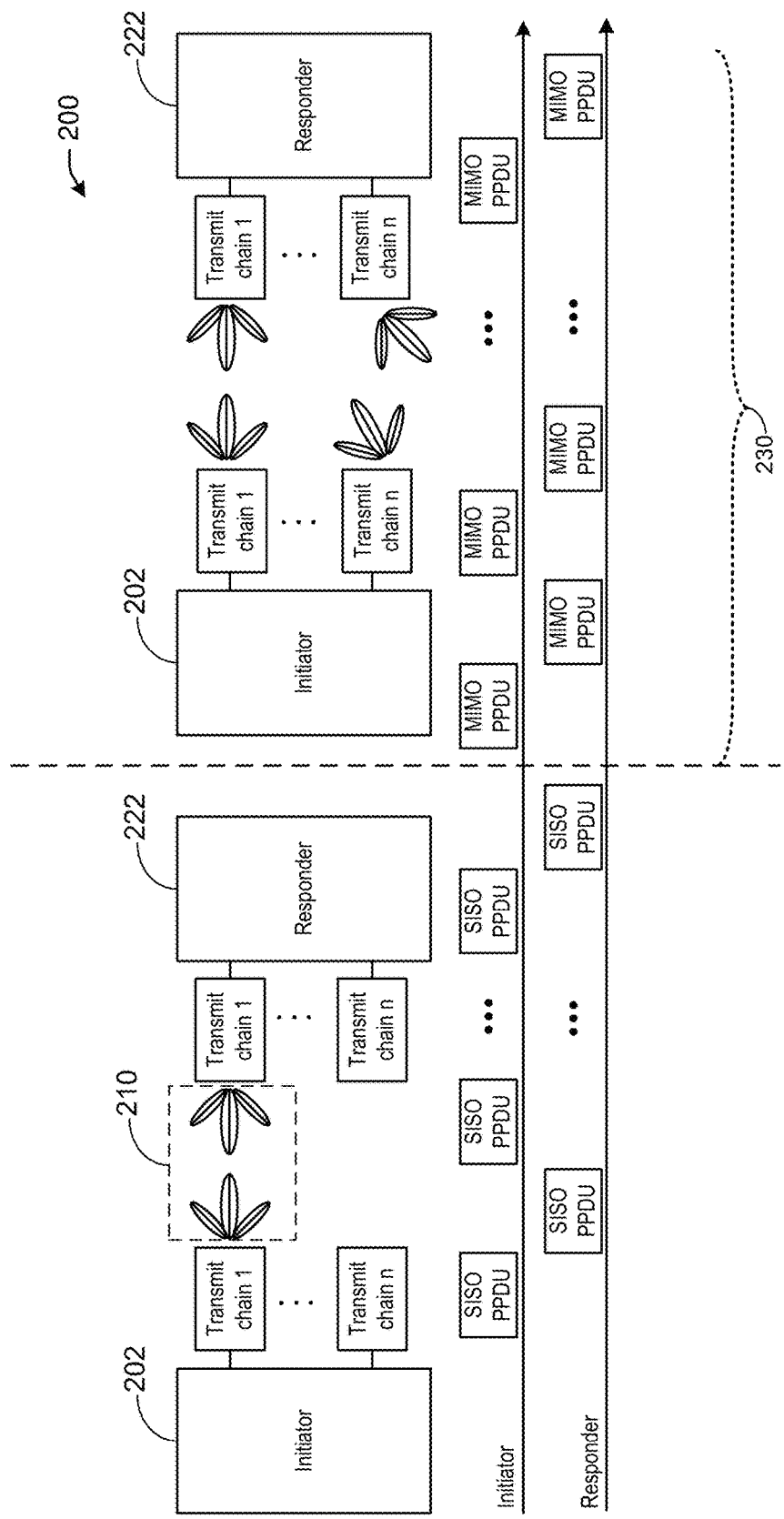
FIG. 2 depicts an illustrative schematic diagram for enhanced MIMO BRP TXSS, in accordance with one or more example embodiments of the present disclosure.

FIG. 2 depicts an illustrative schematic diagram 200 for enhanced MIMO BRP TXSS, in accordance with one or more example embodiments of the present disclosure.

Referring to FIG. 2, there is shown an illustration of the operation of two stations (initiator 202 and responder 222) before and during a MIMO BRP TXSS 230.

Beam refinement protocol (BRP) transmit sector sweep (TXSS) is a procedure defined in IEEE 802.11ay that enables EDMG STAs to perform transmit sector sweep and receive training by using EDMG BRP packets. The advantage of using EDMG BRP packets is that a number of sectors/AWVs can be trained in a single EDMG BRP packet, while sector sweep (SSW)/Short SSW packets used in the "traditional" TXSS procedures only allows for the training of one sector per packet. Therefore, TXSS can be performed in significantly less time with the use of EDMG BRP packets by means of the BRP TXSS procedure.

There are two forms of BRP TXSS: SISO BRP TXSS and MIMO BRP TXSS. A SISO BRP TXSS is a BRP TXSS in which EDMG BRP packets used in the procedure are transmitted using a single transmit chain. The MIMO BRP TXSS 230 is a BRP TXSS in which EDMG BRP packets used in the procedure are transmitted using multiple transmit chains. MIMO BRP TXSS 230 may be used in the first phase (referred to as the "SISO phase") of SU-MIMO beamforming training.

SU-MIMO beamforming training is used by two stations that already have a SISO link (e.g., link 210) established to determine transmit and receive antenna settings for exchanging one or more simultaneous spatial streams (that is, MIMO PPDUs) using multiple transmit chains. The objective of the SISO phase of SU-MIMO beamforming is to enable the stations (e.g., initiator 202 and responder to 22) to either perform or collect feedback of TXSS training. The difficulty of performing MIMO BRP TXSS 230 is illustrated FIG. 2.

As seen in FIG. 2, before MIMO BRP TXSS 230 is started, the two stations (initiator 202 and responder 222) exchange SISO PPDUs only. Because each station only uses one transmit chain (e.g., transmit chain 1 of the initiator 202 and transmit chain 1 of the responder 222) in the transmission of SISO PPDUs, each station has likely only determined the antenna configuration (e.g., antenna weight vector (AWV)) for one of its transmit chains (specifically, the one used in the transmission of SISO PPDUs (e.g., through link 210). Once MIMO BRP TXSS 230 is started, each station with use all transmit chains to be trained when sending MIMO PPDUs. However, as illustrated in FIG. 2, the AWVs of transmit chains not used in the exchange of SISO PPDUs is likely not known.

In one embodiment, an enhanced MIMO BRP TXSS system may define: (1) the AWVs to be used by transmit chains not used in the exchange of SISO PPDUs prior to MIMO BRP TXSS 230; and (2) the PPDU format to be used during MIMO BRP TXSS 230. As an example, the multiple MIMO PPDUs exchanged within the MIMO BRP TXSS 230 may not carry multiple spatial streams because, due to the lack of knowledge of the AWVs to be used by all transmit chains, decoding would likely fail. The current IEEE 802.11ay does not specify these important aspects of MIMO BRP TXSS.

In one embodiment, an enhanced MIMO BRP TXSS system may provide the definitions and flows to address the gaps/aspects identified above.

In one embodiment, an enhanced MIMO BRP TXSS system may facilitate that BRP frames sent in the setup phase of the MIMO BRP TXSS 230 may be transmitted using single input single output (SISO) PPDUs. It should be noted that with this definition, the setup phase of MIMO BRP TXSS 230 may be used to indicate intent to transmit MIMO packets.

In one embodiment, an enhanced MIMO BRP TXSS system may facilitate that in a MIMO BRP TXSS 230, BRP frames sent in the Initiator BRP TXSS, the Responder BRP TXSS, and with acknowledgement may be transmitted using EDMG PPDUs by applying spatial expansion and mapping a single space-time stream to all N transmit chains to be trained in the procedure. The TRN field of EDMG BRP-TX packets used in MIMO BRP TXSS 230 may consist of N orthogonal waveforms The 802.11ay specification could define the use of EDMG control mode PPDUs to make the procedure more robust against possible packet losses.

In one embodiment, an enhanced MIMO BRP TXSS system may facilitate that the AWVs used in the transmission of all fields except for the TRN field of BRP frames sent using spatial expansion in the MIMO BRP TXSS 230: (1) may be the same one used in the setup phase for the transmit chain used in the setup phase; and (2) may be selected in an implementation dependent manner for transmit chains not used in the setup phase. Similarly, the AWVs used in the reception of all fields except for the TRN field of BRP frames sent using spatial expansion in the MIMO BRP TXSS 230 (1) may be the same one used in the setup phase for the receive chain used in the setup phase; and (2) may be selected in an implementation dependent manner for receive chains not used in the setup phase.

As previously mentioned, the current IEEE 802.11ay specification also does not define the complete flow of the Initiator BRP TXSS and the Responder BRP TXSS within the MIMO BRP TXSS 230.

In one embodiment, an enhanced MIMO BRP TXSS system may define the flows using the following definitions:

$N_{init}$ is the value of the TXSS-PACKETS subfield within the EDMG BRP Request element in the BRP frame sent by the initiator to start the BRP TXSS;

$N_{resp}$ is the value of the TXSS-PACKETS subfield within the EDMG BRP Request element in the BRP frame sent by the responder to confirm the BRP TXSS;

$R_{init}$ is the value of the TXSS-REPEAT subfield within the EDMG BRP Request element in the BRP frame sent by the initiator to start the BRP TXSS; and $R_{resp}$ is the value of the TXSS-REPEAT subfield within the EDMG BRP Request element in the BRP frame sent by the responder to confirm the BRP TXSS.

In one embodiment, the Initiator BRP TXSS may consist of the transmission of $N_{init}+1$ EDMG BRP-TX packets consecutively repeated $R_{resp}+1$ times by the initiator followed by the transmission of a BRP frame with feedback by the responder.

In one embodiment, the EDMG BRP-TX packets transmitted in an Initiator BRP TXSS may be configured as follows:

The TRN-Unit RX Pattern field in the EDMG-Header-A may be set to 1;

The EDMG-Header-A of the $i^{th}$ EDMG BRP-TX packet within each of the $R_{resp}+1$ repetitions, where $1 \leq i \leq N_{init}+1$, may have the same value for the fields EDMG TRN Length, EDMG TRN-Unit P, EDMG TRN-Unit M and EDMG TRN-Unit N; and The TRN subfields of the $i^{th}$ EDMG BRP-TX packet within each of the $R_{resp}+1$ repetitions, where $1 \leq i \leq N_{init}+1$, may be transmitted using the same AWVs.

In one embodiment, and similarly, the Responder BRP TXSS may consist of the transmission of $N_{resp}+1$ EDMG BRP-TX packets consecutively repeated $R_{init}+1$ times by the responder followed by the transmission of a BRP frame with feedback by the initiator. The EDMG BRP-TX packets transmitted in a Responder BRP TXSS may be configured as follows:

The TRN-Unit RX Pattern field in the EDMG-Header-A may be set to 1;

The EDMG-Header-A of the $i^{th}$ EDMG BRP-TX packet within each of the $R_{init}+1$ repetitions, where $1 \leq i \leq N_{resp}+1$, may have the same value for the fields EDMG TRN Length, EDMG TRN-Unit P, EDMG TRN-Unit M and EDMG TRN-Unit N; and The TRN subfields of the $i^{th}$ EDMG BRP-TX packet within each of the $R_{init}+1$ repetitions, where $1 \leq i \leq N_{resp}+1$, may be transmitted using the same AWVs.

It is understood that the above descriptions are for purposes of illustration and are not meant to be limiting.

Figure 3:
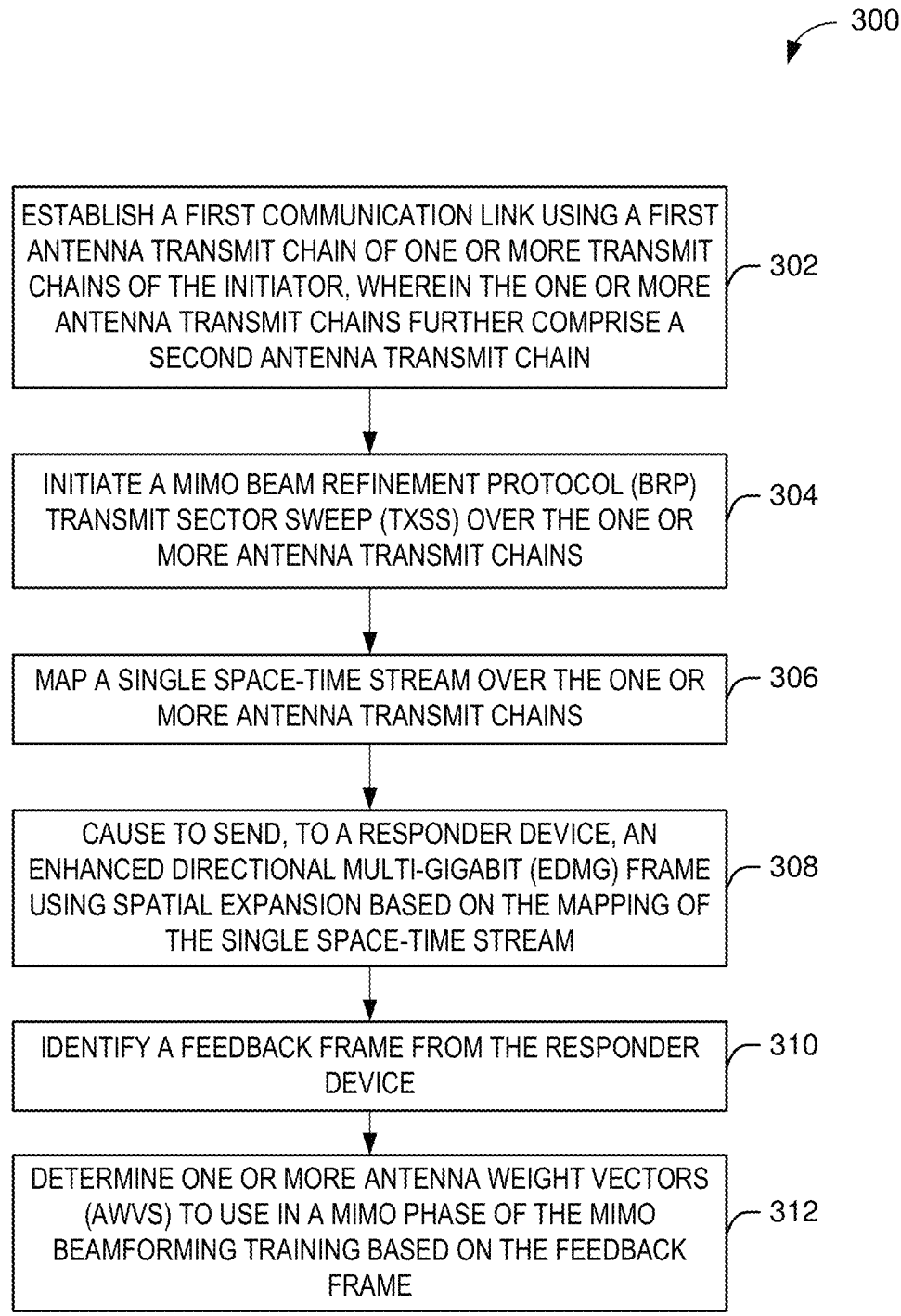
FIG. 3 illustrates a flow diagram of illustrative process for an illustrative enhanced MIMO BRP TXSS system, in accordance with one or more example embodiments of the present disclosure.

FIG. 3 illustrates a flow diagram of illustrative process 300 for an enhanced MIMO BRP TXSS system, in accordance with one or more example embodiments of the present disclosure.

At block 302, a device (e.g., the user device(s) 120 and/or the AP 102 of FIG. 1) may establish a first communication link using a first antenna transmit chain of one or more transmit chains of the initiator, wherein the one or more antenna transmit chains further comprise a second antenna transmit chain. In BRP TXSS, the STA that initiates the procedure through the transmission of a BRP frame is referred to as the initiator, and the recipient STA of the BRP frame that participates in a BRP TXSS with the initiator is referred to as the responder. At block 304, the device may initiate a MIMO beam refinement protocol (BRP) transmit sector sweep (TXSS) over the one or more antenna transmit chains. The MIMO BRP TXSS comprises a setup phase, an initiator BRP TXSS phase, a responder BRP TXSS phase, and a feedback phase. In some examples, the device may cause to send, during an initiator BRP TXSS phase, one or more EDMG BRP packets consecutively repeated based on the repetition indication. Also, the device may use, during the setup phase, a first AWV associated with the first antenna transmit chain. The AWVs used in the transmission of all fields except for the TRN field of BRP frames sent using spatial expansion in a MIMO BRP TXSS: (1) may be the same one used in the setup phase for the transmit chain used in the setup phase; and (2) may be selected in an implementation dependent manner for transmit chains not used in the setup phase. That is, in the setup phase of a MIMO BRP TXSS, if an implementation has not yet determined AWVs to use in some of its transmit chains (for example, if a station has been only using a single transmit chain before the setup phase), the AWVs used by such chains should be selected in an implementation dependent manner. The DMG antennas and AWVs used in the transmission of all fields, except for the TRN field of BRP packets sent in the Initiator BRP TXSS, the Responder BRP TXSS, and with acknowledgement, may be the same ones used in the setup phase. For example, a first antenna uses the same AWV in the transmission of all frames of a BRP TXSS, where the AWV was selected during the setup phase. The selection of the AWV during the setup phase. In other words, once training is started, the station changes its antenna settings until the procedure is completed. It should be understood that this is not valid for the transmission of the TRN field. Similarly, the second antenna uses one AWV from the beginning to the end of the procedure. AWVs used by the first and second antennas is not necessarily the same.

At block 306, the device may map a single space-time stream over the one or more antenna transmit chains. For example, the BRP frames sent in a MIMO BRP TXSS may be transmitted using EDMG PPDUs by applying spatial expansion and mapping a single space-time stream to all N transmit chains to be trained in the procedure. Spatial expansion is a way of transmitting the same data through multiple antennas. That is mapping one stream of data through multiple antennas. However, there may be unintentional beamforming because signals across the different antennas may combine since they transmit the same signal. A cyclic delay shift may then be added to each stream transmitted through each antenna to create a time shift between them. This procedure is known in the literature as cyclic shift diversity (CSD). The same data is received by the receiving device (e.g., responder) except that the TRNs are different for each transmit chain.

At block 308, the device may cause to send, to a responder device, an enhanced directional multi-gigabit (EDMG) frame using spatial expansion based on the mapping of the single space-time stream. For example, causing to send an EDMG frame using spatial expansion may cause to send a first EDMG frame over the first antenna transmit chain and a second EDMG frame over the second antenna transmit chain, such that the second EDMG frame is the same as the first EDMG frame shifted in a time domain. Also, a training (TRN) field of the EDMG frame may comprise one or more orthogonal waveforms.

At block 310, the device may identify a feedback frame from the responder device. The device may also identify a repetition indication received from the responder device.

At block 312, the device may determine one or more antenna weight vectors (AWVs) to use in a MIMO phase of the MIMO beamforming training based on the feedback frame. In some examples, the device may cause to send to the responder device one or more fields of a frame using the first AWV during the MIMO BRP TXSS, where the one or more fields exclude a TRN field of the frame. For example, at the end of the SISO phase of the MIMO BF training, while using the MIMO BRP TXSS, the transmitter would have a set of AWVs to use in the MIMO phase of the MIMO BF training. Each EDMG BRP-TX frame comprises a preamble and a TRN field. The TRN field may be comprised of multiple TRN subfields. The transmitter would use different AWVs when transmitting the TRN field of EDMG BRP-TX frames (that is, transmitter switches AWVs for each TRN subfield). When the receiver receives each of the TRN subfields, the receiver will take measurements (e.g., signal to noise ratio (SNR) and/or received signal strength indicator (RSSI)) for the different TRN subfields that were transmitted with different AWVs. The receiver would order all measurements and picks the best ones (e.g., the measurement with the highest SNR). For example, the receiver may pick three top best measurement, for example, top best measurements for TRN subfield number 15, TRN subfield number 40, and TRN subfield 4 (in a descending order, that is TRN subfield number 15 yielded the best measurement), the receiver would send feedback to the transmitter. The feedback would comprise the these three top best measurements (e.g., 15, 40, and 4). When the transmitter received the feedback, the transmitter learns that the best AWVs were 15, 40, and 4. Using the MIMO BRP TXSS procedure as it is performed as part of a SU-MIMO BF training, when the MIMO phase of SU-MIMO BF training starts, the transmitter will use these best AWVs when selecting which AWVs to use further in the second part of training (MIMO phase).

It is understood that the above descriptions are for purposes of illustration and are not meant to be limiting.

Figure 4:
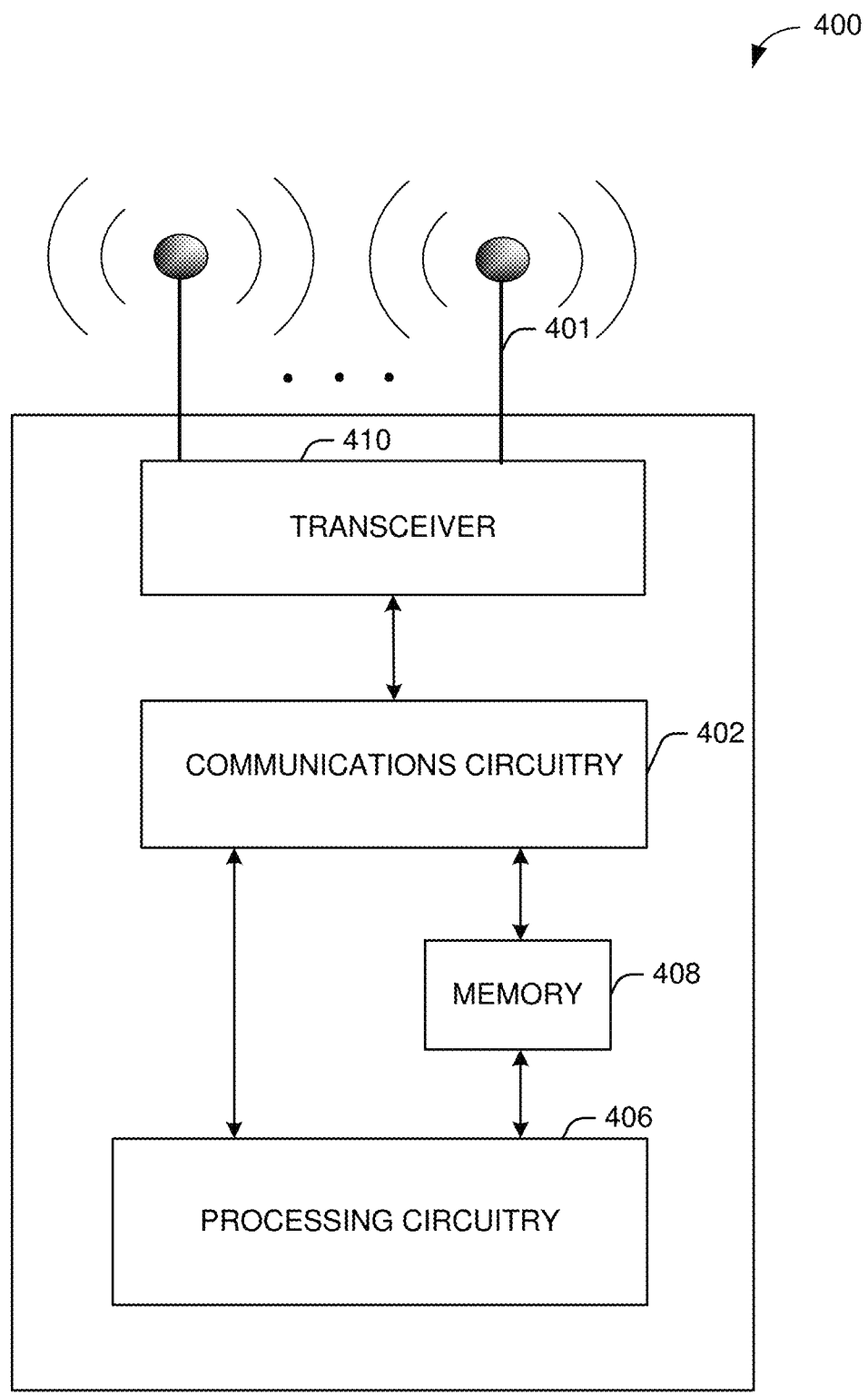
FIG. 4 illustrates a functional diagram of an example communication station that may be suitable for use as a user device, in accordance with one or more example embodiments of the present disclosure.

FIG. 4 shows a functional diagram of an exemplary communication station 400 in accordance with some embodiments. In one embodiment, FIG. 4 illustrates a functional block diagram of a communication station that may be suitable for use as an AP 102 (FIG. 1) or user device 120 (FIG. 1) in accordance with some embodiments. The communication station 400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 400 may include communications circuitry 402 and a transceiver 410 for transmitting and receiving signals to and from other communication stations using one or more antennas 401. The communications circuitry 402 may include circuitry that can operate the physical layer (PHY) communications and/or media access control (MAC) communications for controlling access to the wireless medium, and/or any other communications layers for transmitting and receiving signals. The communication station 400 may also include processing circuitry 406 and memory 408 arranged to perform the operations described herein. In some embodiments, the communications circuitry 402 and the processing circuitry 406 may be configured to perform operations detailed in FIGS. 1-3.

In accordance with some embodiments, the communications circuitry 402 may be arranged to contend for a wireless medium and configure frames or packets for communicating over the wireless medium. The communications circuitry 402 may be arranged to transmit and receive signals. The communications circuitry 402 may also include circuitry for modulation/demodulation, upconversion/downconversion, filtering, amplification, etc. In some embodiments, the processing circuitry 406 of the communication station 400 may include one or more processors. In other embodiments, two or more antennas 401 may be coupled to the communications circuitry 402 arranged for sending and receiving signals. The memory 408 may store information for configuring the processing circuitry 406 to perform operations for configuring and transmitting message frames and performing the various operations described herein. The memory 408 may include any type of memory, including non-transitory memory, for storing information in a form readable by a machine (e.g., a computer). For example, the memory 408 may include a computer-readable storage device, read-only memory (ROM), random-access memory (RAM), magnetic disk storage media, optical storage media, flash-memory devices and other storage devices and media.

In some embodiments, the communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 400 may include one or more antennas 401. The antennas 401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 400 may include one or more of a keyboard, a display, a non-volatile memory port, multiple antennas, a graphics processor, an application processor, speakers, and other mobile device elements. The display may be an LCD screen including a touch screen.

Although the communication station 400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 400 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 400 may include one or more processors and may be configured with instructions stored on a computer-readable storage device memory.

Figure 5:
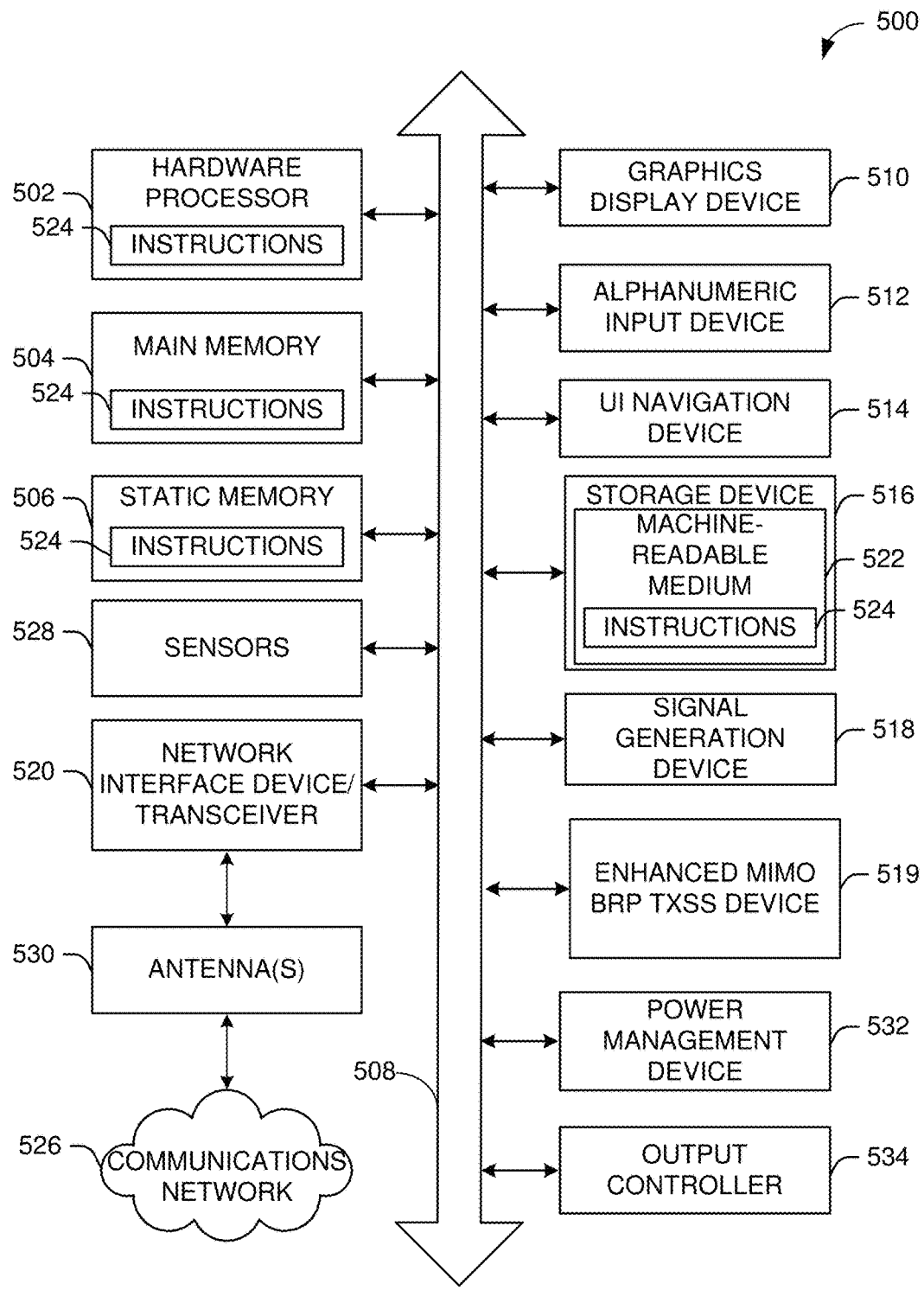
FIG. 5 illustrates a block diagram of an example machine upon which any of one or more techniques (e.g., methods) may be performed, in accordance with one or more example embodiments of the present disclosure.

FIG. 5 illustrates a block diagram of an example of a machine 500 or system upon which any one or more of the techniques (e.g., methodologies) discussed herein may be performed. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environments. The machine 500 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518 (e.g., a speaker), an enhanced MIMO BRP TXSS device 519, a network interface device/transceiver 520 coupled to antenna(s) 530, and one or more sensors 528, such as a global positioning system (GPS) sensor, a compass, an accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

The enhanced MIMO BRP TXSS device 519 may carry out or perform any of the operations and processes (e.g., process 300) described and shown above. For example, the enhanced MIMO BRP TXSS device 519 may define two important configurations/flows of MIMO BRP TXSS. First, an enhanced MIMO BRP TXSS system may facilitate the determination of antenna and frame configurations (e.g., AWVs) that may be used in MIMO BRP TXSS to enable the use of the procedure when the two participating stations do not have an established MIMO link yet (e.g., during the SISO phase as described above). Second, an enhanced MIMO BRP TXSS system may define the overall flow of the Initiator BRP TXSS and the Responder BRP TXSS within a MIMO BRP TXSS, including number of packets and antenna configurations to be used.

In one or more embodiments, an enhanced MIMO BRP TXSS system may facilitate that at the end of the SISO phase of the MIMO BF training, while using the MIMO BRP TXSS, the transmitter would have a set of AWVs to use in the MIMO phase of the MIMO BF training. Each EDMG BRP-TX frame comprises a preamble and a TRN field. The TRN field may be comprised of multiple TRN subfields. The transmitter would use different AWVs when transmitting the TRN field of EDMG BRP-TX frames (that is, transmitter switches AWVs for each TRN subfield). When the receiver receives each of the TRN subfields, the receiver will take measurements (e.g., signal to noise ratio (SNR) and/or received signal strength indicator (RSSI)) for the different TRN subfields that were transmitted with different AWVs. The receiver would order all measurements and picks the best ones (e.g., the measurement with the highest SNR). For example, the receiver may pick three top best measurement, for example, top best measurements for TRN subfield number 15, TRN subfield number 40, and TRN subfield 4 (in a descending order, that is TRN subfield number 15 yielded the best measurement), the receiver would send feedback to the transmitter. The feedback would comprise the these three top best measurements (e.g., 15, 40, and 4). When the transmitter received the feedback, the transmitter learns that the best AWVs were 15, 40, and 4. Using the MIMO BRP TXSS procedure as it is performed as part of a SU-MIMO BF training, when the MIMO phase of SU-MIMO BF training starts, the transmitter will use these best AWVs when selecting which AWVs to use further in the second part of training (MIMO phase).

The enhanced MIMO BRP TXSS device 519 may facilitate that BRP frames sent in a MIMO BRP TXSS may be transmitted using EDMG PPDUs by applying spatial expansion and mapping a single space-time stream to all N transmit chains to be trained in the procedure. Spatial expansion is a way of transmitting the same data through multiple antennas. That is mapping one stream of data through multiple antennas. However, there may be unintentional beamforming because signals across the different antennas may combine since they transmit the same signal. A cyclic delay shift may then be added to each stream transmitted through each antenna to create a time shift between them. This procedure is known in the literature as cyclic shift diversity (CSD). The same data is received by the receiving device (e.g., responder) except that the TRNs are different for each transmit chain.

The enhanced MIMO BRP TXSS device 519 may facilitate that there may be four phases in the MIMO BRP TXSS: (1) setup phase, (2) an initiator BRP TXSS phase, (3) a responder BRP TXSS phase, and (4) a feedback phase.

The enhanced MIMO BRP TXSS device 519 may facilitate that the training (TRN) field of EDMG BRP-TX packets sent in a MIMO BRP TXSS may consist of N orthogonal waveforms.

The enhanced MIMO BRP TXSS device 519 may facilitate that the AWVs used in the transmission of all fields except for the TRN field of BRP frames sent using spatial expansion in a MIMO BRP TXSS: (1) may be the same one used in the setup phase for the transmit chain used in the setup phase; and (2) may be selected in an implementation dependent manner for transmit chains not used in the setup phase. That is, in the setup phase of a MIMO BRP TXSS, if an implementation has not yet determined AWVs to use in some of its transmit chains (for example, if a station has been only using a single transmit chain before the setup phase), the AWVs used by such chains should be selected in an implementation dependent manner. The DMG antennas and AWVs used in the transmission of all fields, except for the TRN field of BRP packets sent in the Initiator BRP TXSS, the Responder BRP TXSS, and with acknowledgement, may be the same ones used in the setup phase. For example, a first antenna uses the same AWV in the transmission of all frames of a BRP TXSS, where the AWV was selected during the setup phase. The selection of the AWV during the setup phase. In other words, once training is started, the station changes its antenna settings until the procedure is completed. It should be understood that this is not valid for the transmission of the TRN field. Similarly, the second antenna uses one AWV from the beginning to the end of the procedure. AWVs used by the first and second antennas is not necessarily the same.

The enhanced MIMO BRP TXSS device 519 may facilitate that the AWVs used in the reception of all fields, except for the TRN field of BRP frames, sent using spatial expansion in a MIMO BRP TXSS (1) may be the same one used in the setup phase for the receive chain used in the setup phase; and (2) may be selected in an implementation dependent manner for receive chains not used in the setup phase.

It is understood that the above are only a subset of what the enhanced MIMO BRP TXSS device 519 may be configured to perform and that other functions included throughout this disclosure may also be performed by the enhanced MIMO BRP TXSS device 519.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques, or utilize one or more sectors of the plurality of antennas to perform beamforming with another device, in accordance with one or more example embodiments of the present disclosure. The term "transmission medium" shall be taken to include any intangible medium that is capable of storing, encoding, or carrying instructions for execution by the machine 500 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: establish a first communication link using a first antenna transmit chain of one or more transmit chains of the initiator, wherein the one or more antenna transmit chains further comprise a second antenna transmit chain; initiate a MIMO beam refinement protocol (BRP) transmit sector sweep (TXSS) over the one or more antenna transmit chains; map a single space-time stream over the one or more antenna transmit chains; cause to send, to a responder device, an enhanced directional multi-gigabit (EDMG) frame using spatial expansion based on the mapping of the single space-time stream; identify a feedback frame from the responder device; and determine one or more antenna weight vectors (AWVs) to use in a MIMO phase of the MIMO beamforming training based on the feedback frame.

Example 2 may include the device of example 1 and/or some other example herein, wherein to cause to send an EDMG frame using spatial expansion comprises the processing circuitry being further configured to cause to send a first EDMG frame over the first antenna transmit chain and a second EDMG frame over the second antenna transmit chain, wherein the second EDMG frame may be the same as the first EDMG frame shifted in a time domain.

Example 3 may include the device of example 1 and/or some other example herein, wherein a training (TRN) field of the EDMG frame comprises one or more orthogonal waveforms.

Example 4 may include the device of example 1 and/or some other example herein, wherein the processing circuitry may be further configured to: identify a repetition indication received from the responder device; and cause to send, during an initiator BRP TXSS phase, one or more EDMG BRP packets consecutively repeated based on the repetition indication.

Example 5 may include the device of example 1 and/or some other example herein, wherein the MIMO BRP TXSS comprises a setup phase, an initiator BRP TXSS phase, a responder BRP TXSS phase, and a feedback phase.

Example 6 may include the device of example 5 and/or some other example herein, wherein the processing circuitry may be further configured to: use, during the setup phase, a first AWV associated with the first antenna transmit chain; and cause to send to the responder device one or more fields of a frame using the first AWV during the MIMO BRP TXSS.

Example 7 may include the device of example 6 and/or some other example herein, wherein the one or more fields exclude a TRN field of the frame.

Example 8 may include the device of example 1 and/or some other example herein, further comprising a transceiver configured to transmit and receive wireless signals.

Example 9 may include the device of example 7 and/or some other example herein, further comprising an antenna coupled to the transceiver.

Example 10 may include a non-transitory computer-readable medium storing computer-executable instructions which when executed by one or more processors result in performing operations comprising: establishing a first communication link using a first antenna transmit chain of one or more transmit chains of an initiator, wherein the one or more antenna transmit chains further comprise a second antenna transmit chain; initiating a MIMO beam refinement protocol (BRP) transmit sector sweep (TXSS) over the one or more antenna transmit chains; mapping a single space-time stream over the one or more antenna transmit chains; causing to send, to a responder device, an enhanced directional multi-gigabit (EDMG) frame using spatial expansion based on the mapping of the single space-time stream; identifying a feedback frame from the responder device; and determining one or more antenna weight vectors (AWVs) to use in a MIMO phase of the MIMO beamforming training based on the feedback frame.

Example 11 may include the non-transitory computer-readable medium of example 10 and/or some other example herein, wherein to cause to send an EDMG frame using spatial expansion comprises the operations further comprise causing to send a first EDMG frame over the first antenna transmit chain and a second EDMG frame over the second antenna transmit chain, wherein the second EDMG frame may be the same as the first EDMG frame shifted in a time domain.

Example 12 may include the non-transitory computer-readable medium of example 10 and/or some other example herein, wherein a training (TRN) field of the EDMG frame comprises one or more orthogonal waveforms.

Example 13 may include the non-transitory computer-readable medium of example 10 and/or some other example herein, wherein the operations further comprise: identifying a repetition indication received from the responder device; and causing to send, during an initiator BRP TXSS phase, one or more EDMG BRP packets consecutively repeated based on the repetition indication.

Example 14 may include the non-transitory computer-readable medium of example 10 and/or some other example herein, wherein the MIMO BRP TXSS comprises a setup phase, an initiator BRP TXSS phase, a responder BRP TXSS phase, and a feedback phase.

Example 15 may include the non-transitory computer-readable medium of example 14 and/or some other example herein, wherein the operations further comprise: using, during the setup phase, a first AWV associated with the first antenna transmit chain; and causing to send to the responder device one or more fields of a frame using the first AWV during the MIMO BRP TXSS.

Example 16 may include the non-transitory computer-readable medium of example 15 and/or some other example herein, wherein the one or more fields exclude a TRN field of the frame.

Example 17 may include a method comprising: Establishing, by one or more processors, a first communication link using a first antenna transmit chain of one or more transmit chains of an initiator, wherein the one or more antenna transmit chains further comprise a second antenna transmit chain; initiating a MIMO beam refinement protocol (BRP) transmit sector sweep (TXSS) over the one or more antenna transmit chains; mapping a single space-time stream over the one or more antenna transmit chains; causing to send, to a responder device, an enhanced directional multi-gigabit (EDMG) frame using spatial expansion based on the mapping of the single space-time stream; identifying a feedback frame from the responder device; and determining one or more antenna weight vectors (AWVs) to use in a MIMO phase of the MIMO beamforming training based on the feedback frame.

Example 18 may include the method of example 17 and/or some other example herein, wherein to cause to send an EDMG frame using spatial expansion further comprising causing to send a first EDMG frame over the first antenna transmit chain and a second EDMG frame over the second antenna transmit chain, wherein the second EDMG frame may be the same as the first EDMG frame shifted in a time domain.

Example 19 may include the method of example 17 and/or some other example herein, wherein a training (TRN) field of the EDMG frame comprises one or more orthogonal waveforms.

Example 20 may include the method of example 17 and/or some other example herein, further comprising: identifying a repetition indication received from the responder device; and causing to send, during an initiator BRP TXSS phase, one or more EDMG BRP packets consecutively repeated based on the repetition indication.

Example 21 may include the method of example 17 and/or some other example herein, wherein the MIMO BRP TXSS comprises a setup phase, an initiator BRP TXSS phase, a responder BRP TXSS phase, and a feedback phase.

Example 22 may include the method of example 21 and/or some other example herein, further comprising: using, during the setup phase, a first AWV associated with the first antenna transmit chain; and causing to send to the responder device one or more fields of a frame using the first AWV during the MIMO BRP TXSS.

Example 23 may include the method of example 22 and/or some other example herein, wherein the one or more fields exclude a TRN field of the frame.

Example 24 may include an apparatus comprising means for: establishing a first communication link using a first antenna transmit chain of one or more transmit chains of an initiator, wherein the one or more antenna transmit chains further comprise a second antenna transmit chain; initiating a MIMO beam refinement protocol (BRP) transmit sector sweep (TXSS) over the one or more antenna transmit chains; mapping a single space-time stream over the one or more antenna transmit chains; causing to send, to a responder device, an enhanced directional multi-gigabit (EDMG) frame using spatial expansion based on the mapping of the single space-time stream; identifying a feedback frame from the responder device; and determining one or more antenna weight vectors (AWVs) to use in a MIMO phase of the MIMO beamforming training based on the feedback frame.

Example 25 may include the apparatus of example 24 and/or some other example herein, wherein the means for causing to send an EDMG frame using spatial expansion comprises the means for causing to send a first EDMG frame over the first antenna transmit chain and a second EDMG frame over the second antenna transmit chain, wherein the second EDMG frame may be the same as the first EDMG frame shifted in a time domain.

Example 26 may include the apparatus of example 24 and/or some other example herein, wherein a training (TRN) field of the EDMG frame comprises one or more orthogonal waveforms.

Example 27 may include the apparatus of example 24 and/or some other example herein, further comprising the means for: identifying a repetition indication received from the responder device; and causing to send, during an initiator BRP TXSS phase, one or more EDMG BRP packets consecutively repeated based on the repetition indication.

Example 28 may include the apparatus of example 24 and/or some other example herein, wherein the MIMO BRP TXSS comprises a setup phase, an initiator BRP TXSS phase, a responder BRP TXSS phase, and a feedback phase.

Example 29 may include the apparatus of example 28 and/or some other example herein, further comprising the means for: using, during the setup phase, a first AWV associated with the first antenna transmit chain; and causing to send to the responder device one or more fields of a frame using the first AWV during the MIMO BRP TXSS.

Example 30 may include the apparatus of example 29 and/or some other example herein, wherein the one or more fields exclude a TRN field of the frame.

Example 31 may include one or more non-transitory computer-readable media comprising instructions to cause an electronic device, upon execution of the instructions by one or more processors of the electronic device, to perform one or more elements of a method described in or related to any of examples 1-30, or any other method or process described herein Example 32 may include an apparatus comprising logic, modules, and/or circuitry to perform one or more elements of a method described in or related to any of examples 1-30, or any other method or process described herein.

Example 33 may include a method, technique, or process as described in or related to any of examples 1-30, or portions or parts thereof.

Example 34 may include an apparatus comprising: one or more processors and one or more computer readable media comprising instructions that, when executed by the one or more processors, cause the one or more processors to perform the method, techniques, or process as described in or related to any of examples 1-30, or portions thereof.

Example 35 may include a method of communicating in a wireless network as shown and described herein.

Example 36 may include a system for providing wireless communication as shown and described herein.

Example 37 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device of an initiator for performing multiple-input multiple-output (MIMO) beamforming training the device comprising processing circuitry and storage, the processing circuitry coupled to the storage, and the processing circuitry configured to:

establish a first communication link using a first antenna transmit chain of one or more transmit chains of the initiator, wherein the one or more antenna transmit chains further comprise a second antenna transmit chain;

initiate a MIMO beam refinement protocol (BRP) transmit sector sweep (TXSS) over the one or more antenna transmit chains;

map a single space-time stream over the one or more antenna transmit chains;

cause to send, to a responder device, an enhanced directional multi-gigabit (EDMG) frame using spatial expansion based on the mapping of the single space-time stream;

identify a feedback frame from the responder device; and determine one or more antenna weight vectors (AWVs) to use in a MIMO phase of the MIMO beamforming training based on the feedback frame.

2. The device of claim 1, wherein to cause to send an EDMG frame using spatial expansion comprises the processing circuitry being further configured to cause to send a first EDMG frame over the first antenna transmit chain and a second EDMG frame over the second antenna transmit chain, wherein the second EDMG frame is the same as the first EDMG frame shifted in a time domain.

3. The device of claim 1, wherein a training (TRN) field of the EDMG frame comprises one or more orthogonal waveforms.

4. The device of claim 1, wherein the processing circuitry is further configured to:

identify a repetition indication received from the responder device; and cause to send, during an initiator BRP TXSS phase, one or more EDMG BRP packets consecutively repeated based on the repetition indication.

5. The device of claim 1, wherein the MIMO BRP TXSS comprises a setup phase, an initiator BRP TXSS phase, a responder BRP TXSS phase, and a feedback phase.

6. The device of claim 5, wherein the processing circuitry is further configured to:

use, during the setup phase, a first AWV associated with the first antenna transmit chain; and cause to send to the responder device one or more fields of a frame using the first AWV during the MIMO BRP TXSS.

7. The device of claim 6, wherein the one or more fields exclude a training (TRN) field of the frame.

8. The device of claim 1, further comprising a transceiver configured to transmit and receive wireless signals.

9. The device of claim 8, further comprising an antenna of the initiator, including the first antenna transmit chain and the second antenna transmit chain, coupled to the processing circuitry.

10. A non-transitory computer-readable medium storing computer-executable instructions which when executed by one or more processors result in performing operations comprising:

establishing a first communication link using a first antenna transmit chain of one or more transmit chains of an initiator, wherein the one or more antenna transmit chains further comprise a second antenna transmit chain;

initiating a MIMO beam refinement protocol (BRP) transmit sector sweep (TXSS) over the one or more antenna transmit chains;

mapping a single space-time stream over the one or more antenna transmit chains;

causing to send, to a responder device, an enhanced directional multi-gigabit (EDMG) frame using spatial expansion based on the mapping of the single space-time stream;

identifying a feedback frame from the responder device; and determining one or more antenna weight vectors (AWVs) to use in a MIMO phase of the MIMO beamforming training based on the feedback frame.

11. The non-transitory computer-readable medium of claim 10, wherein to cause to send an EDMG frame using spatial expansion comprises the operations further comprise causing to send a first EDMG frame over the first antenna transmit chain and a second EDMG frame over the second antenna transmit chain, wherein the second EDMG frame is the same as the first EDMG frame shifted in a time domain.

12. The non-transitory computer-readable medium of claim 10, wherein a training (TRN) field of the EDMG frame comprises one or more orthogonal waveforms.

13. The non-transitory computer-readable medium of claim 10, wherein the operations further comprise:

identifying a repetition indication received from the responder device; and causing to send, during an initiator BRP TXSS phase, one or more EDMG BRP packets consecutively repeated based on the repetition indication.

14. The non-transitory computer-readable medium of claim 10, wherein the MIMO BRP TXSS comprises a setup phase, an initiator BRP TXSS phase, a responder BRP TXSS phase, and a feedback phase.

15. The non-transitory computer-readable medium of claim 14, wherein the operations further comprise:

using, during the setup phase, a first AWV associated with the first antenna transmit chain; and causing to send to the responder device one or more fields of a frame using the first AWV during the MIMO BRP TXSS.

16. The non-transitory computer-readable medium of claim 15, wherein the one or more fields exclude a training (TRN) field of the frame.

17. A method comprising:

establishing, by one or more processors, a first communication link using a first antenna transmit chain of one or more transmit chains of an initiator, wherein the one or more antenna transmit chains further comprise a second antenna transmit chain;

initiating a MIMO beam refinement protocol (BRP) transmit sector sweep (TXSS) over the one or more antenna transmit chains;

mapping a single space-time stream over the one or more antenna transmit chains;

causing to send, to a responder device, an enhanced directional multi-gigabit (EDMG) frame using spatial expansion based on the mapping of the single space-time stream;

identifying a feedback frame from the responder device; and determining one or more antenna weight vectors (AWVs) to use in a MIMO phase of the MIMO beamforming training based on the feedback frame.

18. The method of claim 17, wherein to cause to send an EDMG frame using spatial expansion further comprising causing to send a first EDMG frame over the first antenna transmit chain and a second EDMG frame over the second antenna transmit chain, wherein the second EDMG frame is the same as the first EDMG frame shifted in a time domain.

19. The method of claim 17, wherein a training (TRN) field of the EDMG frame comprises one or more orthogonal waveforms.

20. The method of claim 17, wherein the processing circuitry is further configured to:

identifying a repetition indication received from the responder device; and causing to send, during an initiator BRP TXSS phase, one or more EDMG BRP packets consecutively repeated based on the repetition indication.

\* \* \* \* \*